United States Patent [19]

Ebihara

[11] Patent Number: 5,648,961
[45] Date of Patent: Jul. 15, 1997

[54] RADIO TELEPHONE SYSTEM AND ANTENNA DEVICE AND BASE STATION FOR THE SAME

[75] Inventor: Takamasa Ebihara, Tokyo, Japan

[73] Assignee: Meisei Electric Co., Ltd., Tokyo, Japan

[21] Appl. No.: 551,558

[22] Filed: Nov. 1, 1995

[30] Foreign Application Priority Data

Nov. 21, 1994 [JP] Japan ..................... 6-286665

[51] Int. Cl.$^6$ ..................... H04J 3/16; H04J 3/06
[52] U.S. Cl. ..................... 370/282; 370/294; 359/152; 455/562
[58] Field of Search ..................... 370/95.1, 95.3, 370/100.1, 103, 108; 455/33.1, 33.2, 51.1, 34.1; 379/59, 60

[56] References Cited

U.S. PATENT DOCUMENTS

| | | | |
|---|---|---|---|
| 5,448,570 | 9/1995 | Toda et al. | 370/103 |
| 5,481,541 | 1/1996 | Gareh et al. | 370/103 |
| 5,528,596 | 6/1996 | Fisher et al. | 370/103 |

*Primary Examiner*—Douglas W. Olms
*Assistant Examiner*—Ajit Patel
*Attorney, Agent, or Firm*—McAulay Fisher Nissen Goldberg & Kiel, LLP

[57] ABSTRACT

A radio telephone system and an antenna device and a base station for the same which permit the expansion of a radio communication range and also further extension of the distance between the base station and an antenna. A single base station accommodates a plurality of antenna devices and the base station and the antenna devices are connected by optical fiber cables. Each of the antenna devices is equipped primarily with an optical-to-electrical converter, an electrical-to-optical converter, a distributor, frequency converters/amplifiers, local frequency oscillators, a control channel signal detector, a transmit/receive switcher, a controller, and antenna. The transmit/receive switching control is synchronized with the transmitting and receiving timings for send and receive signals transferred to and from the base station by using a slot number transmitted through a transmission control channel. The plurality of antenna devices connected to the single base station make it possible to expand the radio communication range to an arbitrary range in practical use; they also permit free selection of an area of radio communication range by connecting the base station with the antenna devices by optical fiber cables. In addition, the transmit/receive switching control of the antenna devices is carried out in accordance with the receiving timing of a slot number of a transmission control channel from the base station. This ensures accurate transmit/receive switching control.

10 Claims, 3 Drawing Sheets

RADIO TELEPHONE SYSTEM AND ANTENNA DEVICE AND BASE STATION FOR THE SAME

BACKGROUND OF THE INVENTION

1. Field of the Invention

The present invention relates to a radio telephone system, which achieves a wide radio communication range at an arbitrary location by installing an antenna at a location apart from a base station; in a TDMA cordless telephone apparatus, and an antenna device and a base station employed for the radio telephone system.

2. Description of the Related Art

In a conventional TDMA cordless telephone apparatus, an antenna is installed directly at a base station or the base station and the antenna are installed one-to-one at locations apart from each other and connected by a coaxial cable.

When using a radio telephone system based on a prior technique for an application requiring a wide radio communication range, such as in a case where the system is used at a factory or the like, more antennas are necessary. This means that more base stations are necessary according to this conventional method, which automatically involves adding more telephone lines to be connected to the base stations.

Further, when an antenna needs to be installed apart from a base station, a signal is inevitably attenuated as it is transmitted over a coaxial cable which connects the base station with the antenna. This presents a problem because the distance between the base station and the antenna is therefore limited.

OBJECT AND SUMMARY OF THE INVENTION

The present invention has been made with a view toward solving the problem stated above, and it is a primary object of the present invention to enable a plurality of antennas to be connected to a single base station and also to allow the distance between the base station and the antennas to be extended so that it is sufficiently long in practical use.

To this end, according to the present invention, an antenna device equipped with its own control function is provided between a base station and an antenna; a send signal and a receive signal are transferred independently through separate transmission lines, namely, optical fiber cables, for example, between the antenna device and the base station. While a speech channel is being set, a control channel is monitored by the aforesaid antenna device and the transmit/receive switching of an antenna of the aforesaid antenna device is synchronized with the transmit/receive operation at the base station in accordance with receiving timing of particular information of a particular slot in the control channel.

More specifically, a transmitting system of the aforesaid antenna device has an optical-to-electrical converter, a distributor for distributing a send signal into two signal paths, a frequency converter/amplifier and a local frequency oscillator for a control channel (if necessary), a detector for a control channel signal, and a frequency converter/amplifier for a send signal (if necessary). A receiving system of the antenna device has a frequency converter/amplifier for a receive signal (if necessary) and an electrical-to-optical converter. Further, the transmitting system and the receiving system share an antenna, a transmit/receive switcher, a local frequency oscillator (if necessary), and a controller. The antenna device performs the control operation set forth below.

To control the transmit/receive switcher of the antenna device, a signal induced in the control channel of a send signal (control channel signal) is sent to the controller via the optical-to-electrical converter, the distributor, the control channel frequency converter/amplifier, and the control channel signal detector in that order. The controller analyzes the control channel signal to detect particular information of a particular slot written in the control channel, namely, the slot number, and generates a switching control signal for controlling the transmit/receive switcher.

There is a time difference attributable to the hardware involved in the signal transmission and there is also a time difference attributable to the time spent by the controller for analyzing the control channel signal from the moment the switching control signal is sent out to the transmit/receive switcher after the antenna device receives the send signal and the controller detects the particular information of the particular slot of the control channel to the moment the send signal reaches the antenna. In order to precisely synchronize the transmit/receive switching operation of the antenna with the transmit/receive operation at the base station, careful consideration must be given to the time delay caused by the time differences stated above when generating the switching control signal. According to the present invention, the controller of the antenna device is further equipped with correcting means for such time delay.

When a plurality of antenna devices is connected to a single base station, one-to-one radio speech paths are set between telephones and the antenna devices.

Hence, in order to establish radio speech paths, the antenna devices, which receive radio waves from telephones, send the electric field strengths of the receive radio waves to the base station. The base station receives the electric field strengths, compares the receive electric field strengths among the antenna devices, and selects the antenna device which has sent the greatest receive electric field strength and connects the selected antenna device to the base station and releases other antenna devices from the base station.

According to the present invention, a single base station can accommodate a plurality of antenna devices and therefore, the radio communication range of a single base station can be freely expanded by increasing the number of antenna devices. Connecting a base station with antenna devices with optical fiber cables makes it possible to extend the distance between the base station and the antenna devices to a sufficiently long distance in practical use.

The transmit/receive switching control of the speech signals in the antenna devices is performed by utilizing the information which is sent from the base station to the antenna devices via control channels; the controllers of the antenna devices correct the delay until the information is decoded, then they produce the speech channel transmit/receive switching signals. This permits accurate transmit/receive switching control.

A plurality of antenna devices can be connected to a single base station. To set a radio speech path, only one antenna device which has the greatest receive electric field strength is selected to allow an optimum radio speech path to be established.

For a better understanding of the present invention, reference is made to the following description and accompanying drawings while the scope of the invention will be pointed out in the appended claims.

DESCRIPTION OF THE PREFERRED EMBODIMENTS

Figure 1:
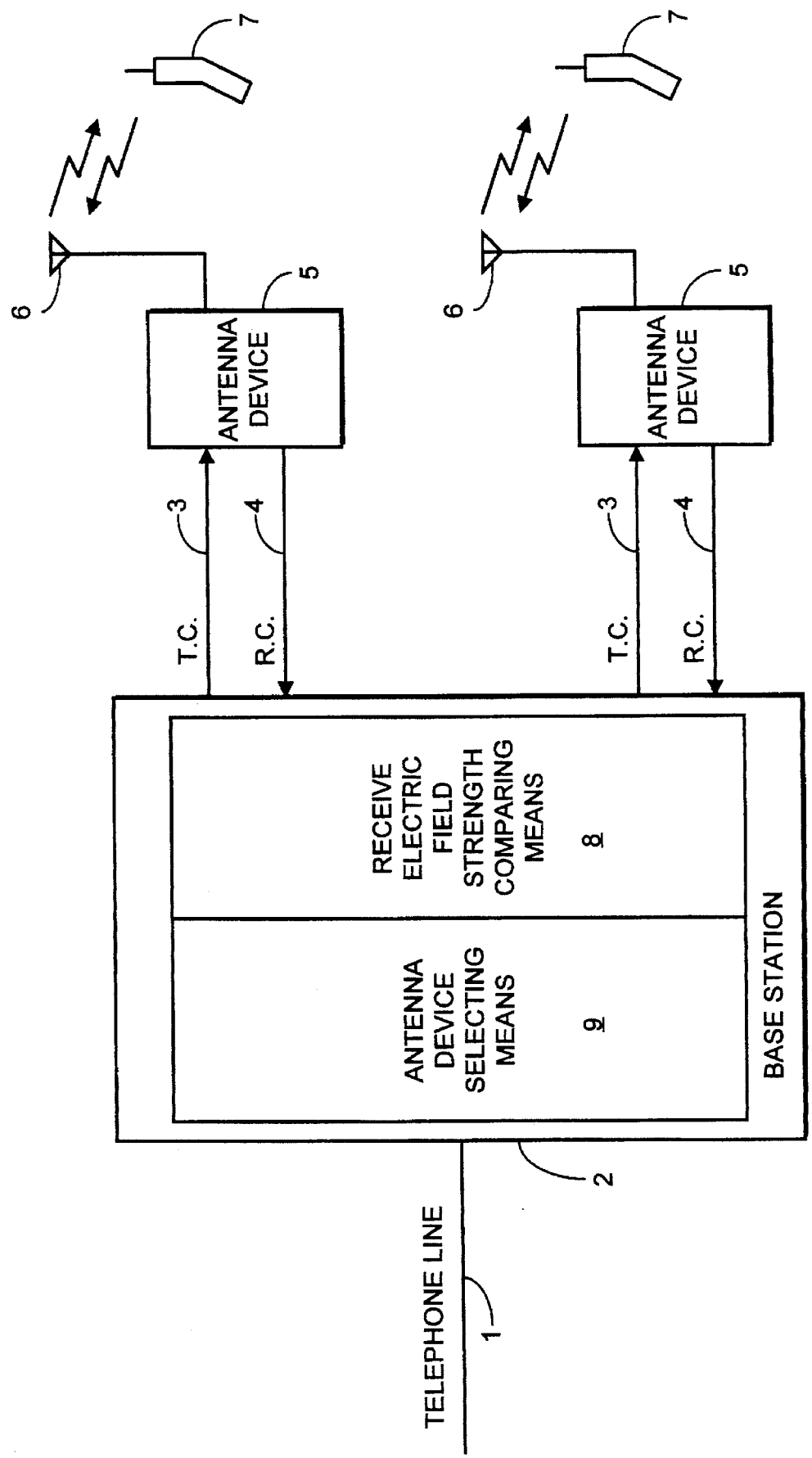
FIG. 1 is a block diagram illustrative of a TDMA cordless telephone apparatus showing an embodiment according to the present invention.

The TDMA type cordless telephone apparatus shown in FIG. 1 has a telephone line 1, a base station 2, a transmitting optical fiber cable 3, a receiving optical fiber cable 4, an antenna device 5, an antenna 6, and a cordless telephone 7 (hereinafter referred to simply as "telephone").

Figure 2:
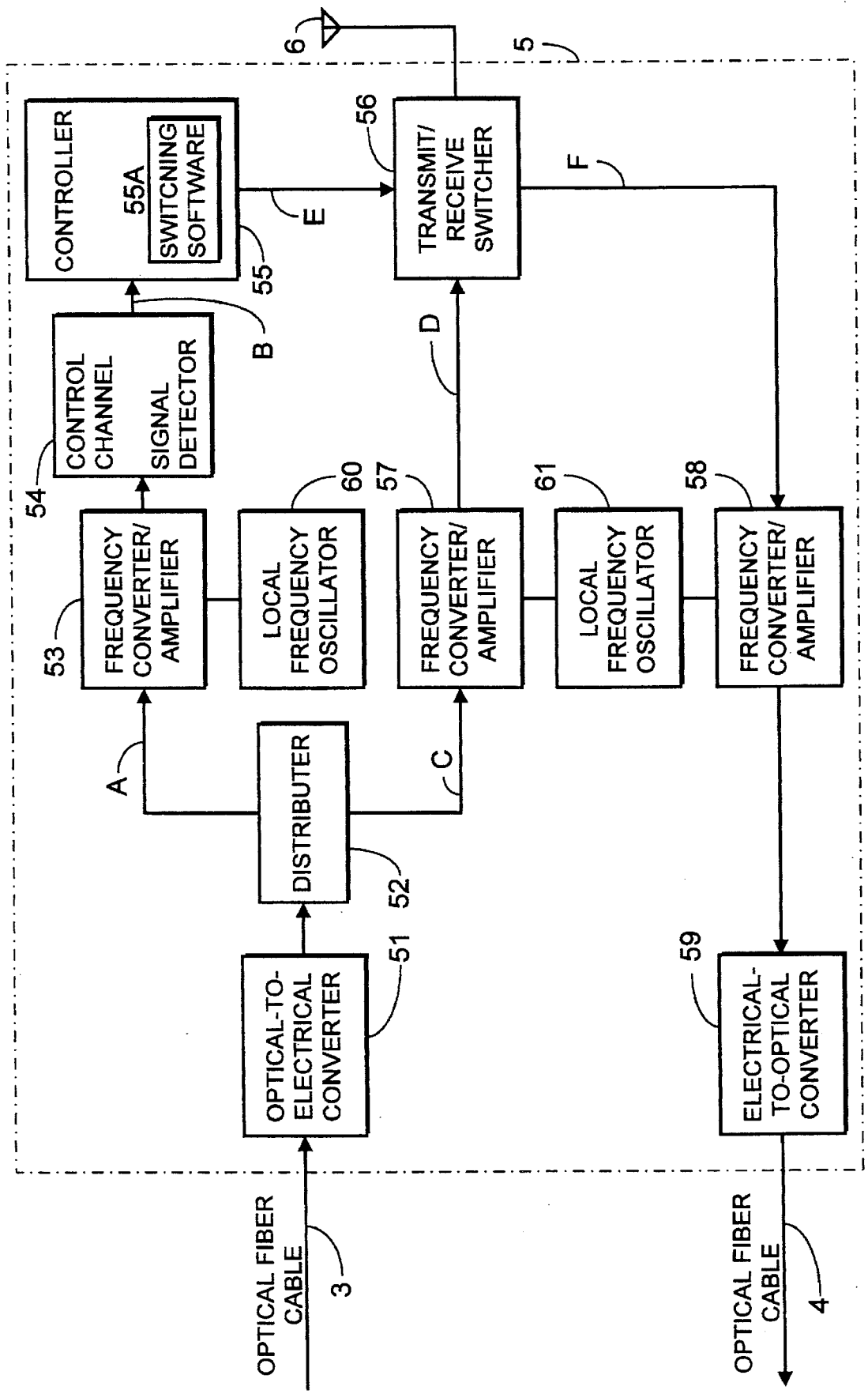
FIG. 2 is a block diagram illustrative of an antenna device showing an embodiment according to the present invention.

In FIG. 2, reference numerals 3 to 6 denote the same component units as those shown in FIG. 1; other reference numerals denote the component units set forth below.

Reference numeral 51 indicates an optical-to-electrical converter which converts an optical signal (a send signal), which has been received via the optical fiber cable 3, into an electrical signal. Reference numeral 52 indicates a distributor which distributes the send signal, which has been converted into the electrical signal through the optical-to-electrical converter 51, to reed A and reed C. Reference numeral 53 indicates a frequency converter/amplifier for control channel of send signals; the frequency converter/amplifier carries out frequency conversion to take out a signal, which is to be transmitted through the control channel, from the send signal which has been distributed to reed A from the distributor 52 and it also amplifies the converted signal. Reference numeral 54 indicates a control channel signal detector which detects, by an operation similar to demodulation, a control channel signal from the output signal of the frequency converter/amplifier 53 and converts the control channel signal (analog signal) into a digital signal which it issues. Reference numeral 55 indicates a controller which is constituted mainly by a CPU; the controller processes the control channel signal, which has been received via the control channel signal detector 54, by the software for transmit/receive switching control (hereinafter referred to as "switching software") 55A so as to create a switching control signal. The switching software 55A includes the software for correcting the switching timing delay caused by the time required for processing the control channel signals and the time required for transmitting a signal in the circuit of the antenna device. Reference numeral 56 denotes a transmit/receive switcher which switches the antenna 6 to reed D or reed F in accordance with the switching control signal received from the controller 55. Reference numeral 57 denotes the frequency converter/amplifier for send signals; the frequency converter/amplifier carries out frequency conversion on the send signal, which has been allotted to reed C by the distributor 52, so as to turn the send signal into a signal of a predetermined carrier frequency, then it amplifies the converted send signal. Reference numeral 58 denotes a frequency converter/amplifier for receive signals; the frequency converter/amplifier carries out frequency conversion on the receive signal issued by the transmit/receive switcher 56 so as to turn the receive signal into a signal suited for the transmission through the optical fiber cable 4, then it amplifies the converted receive signal. Reference numeral 59 indicates an electrical-to-optical converter which converts the receive signal, which is issued as an electrical signal from the frequency converter/amplifier 58, into an optical signal before sending it out to the optical fiber cable 4. Reference numeral 60 denotes a local frequency oscillator for control channel; the local frequency oscillator generates a frequency conversion signal for extracting a control channel signal from a send signal. Reference numeral 61 denotes a local frequency oscillator for both send and receive signals; the local frequency oscillator generates a signal for converting the frequency of a send or receive signal into a predetermined frequency.

If the frequencies of a send signal and a receive signal transferred between the base station 2 and the antenna device 5 via the optical fiber cables 3 and 4 in the configuration stated above coincide with the frequencies of the radio signals transferred between the telephone 7 and the antenna 6, then there is no need to provide the frequency converters/amplifiers 53, 57, and 58 (at least the frequency converters thereof), and the local frequency oscillators 60 and 61.

Figure 3:
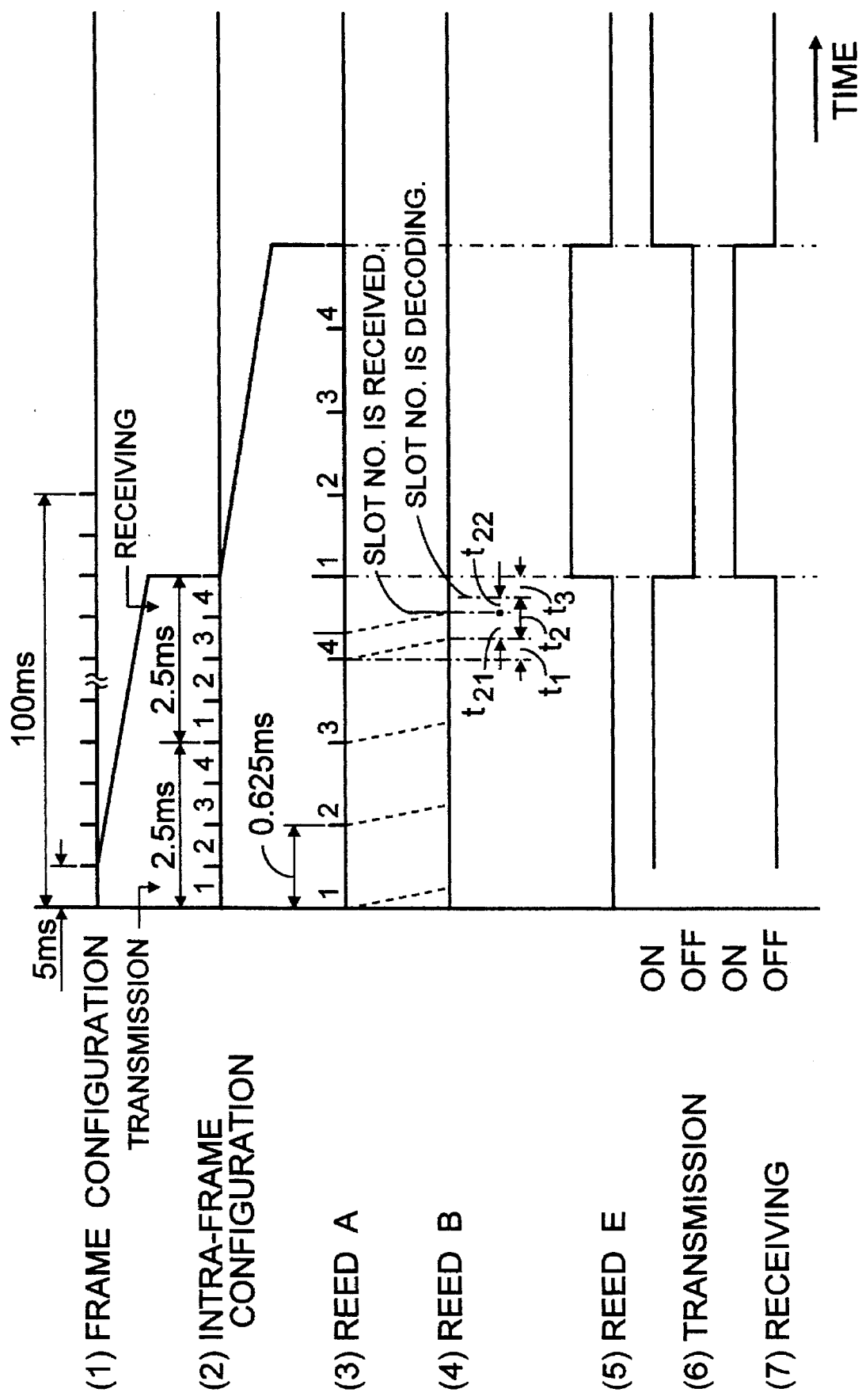
FIG. 3 is a timing chart of the transmit/receive switching carried out in the antenna device of the embodiment according to the present invention.

In FIG. 3, (1) shows the frame structure of the control channel of a send signal; (2) gives a partially enlarged view illustrative of the structure of a frame; (3) gives a further enlarged view illustrative of the signal of reed A (see FIG. 2); (4) shows the signal output to reed B (see FIG. 2); (5) shows the transmit/receive switching signal output to reed E (see FIG. 2); (6) shows the transmitting time chart for a radio speech path; and (7) shows the receiving time chart for the radio speech path.

As shown in (1) of FIG. 3, the control channel of the send signal sets 5 ms for one frame, and as shown in (2) of FIG. 3, one frame of the control channel includes four slots each of the transmission control channel and the receiving control channel. This is repeated for every 100 ms, i.e. every 20 frames. Eighty transmission slots and eighty receiving slots are included in 100 ms, and the control channels are repeatedly received by the antenna device 5 every 100 ms. The antenna 5 keeps on monitoring the control channels while the speech circuit is being established.

With respect to the control channels, as shown in FIG. 3 (6) and (7), the send signal is set, for example, to 2.5 ms and the receive signal to 2.5 ms, which make 5 ms in total, to constitute one frame of the aforesaid control channel. Thus, the transmission and receiving are repeated at 5-ms synchronization, the speech channel being multiplexed by frequency division for both transmission and receiving.

The multiplexed transmission and receiving speech channels correspond one-to-one to the 80-slot transmission and receiving control channels, respectively. There are 80 speech channels for transmission and receiving, respectively, and each speech channel is controlled by its corresponding control channel.

The numerical values used for the frame structure described above are all examples, and the numerical values do not necessarily apply depending on the system used.

In FIG. 1, when an incoming call is present in the telephone line, the base station 2 detects the incoming call signal and sends the incoming call signal to all antenna devices 5 via the optical fiber cables 3. The antenna devices 5 then send the incoming call signal to radio links through the antenna 6. When the telephones 7 receive incoming call signals and respond, the telephones 7 send out response signals which are received by the antenna devices 5 via the antenna 6 and transmitted to the base station 2 via the optical fiber cables 4. When the base station 2 receives the response signals from a plurality of antenna devices 5, receive electric field strength comparing means 8 compares the information on the receive electric field strength induced in the response signals to select the antenna device 5 which has the greatest electric field strength, then antenna device selecting means establishes a radio speech path between the selected antenna device 5 and the telephone 7 to enable the speech. The antenna devices 5 other than the selected antenna device 5 are reset under the control at the base station 2.

When the telephone 7 originates a call, the telephone 7 sends out an originating call signal which is received by the antenna device 5 via the antenna 6, then it is transmitted to the base station 2 via the optical fiber cable 4. If the base station 2 receives originating call signals from a plurality of antenna devices 5 (e.g. when the telephone 7 is located in an area where the service areas of a plurality of antenna devices 5 overlap), then receive electric field strength comparing means 8 compares the information on the receive electric field strength included in the originating call signals to select the antenna device 5 which has the greatest electric field strength, then antenna device selecting means 9 establishes a radio speech path between the selected antenna device 5 and the telephone 7 and proceeds to the connecting operation. The antenna devices 5 other than the selected antenna device 5 are reset under the control at the base station 2.

A telephone call is enabled by the control operation described above. For the telephone call, the control of switching between transmission and receiving in the antenna devices 5 is performed in synchronization with the transmission and receiving operation at the base station. The switching control will now be described with reference to FIG. 3.

When the antenna device 5 receives an optical send signal from the base station 2 via the optical fiber cable 3, the optical-to-electrical converter 51 converts the optical signal to an electrical signal and applies the send signal, which has been converted to the electrical signal, to the distributor 52. The send signal applied to the distributor 52 is divided and sent to reed A and reed C. A signal from the local frequency oscillator 60 is added to the send signal, which has been supplied to reed A, in the frequency converter/amplifier 53 so as to convert the send signal to the signal having a frequency assigned to the control channel. This makes it possible to select the signal component of the frequency assigned to the control channel, i.e. the control channel signal, from the send signal and to amplify the control channel signal which is applied to the following control channel signal detector 54. The control channel signal detector 54 detects the control channel signal and converts it to digital data and supplies the digital data to the controller 55. As shown in (2) of FIG. 3, the aforesaid control channel has four slots each for transmission and receiving in one frame. Each slot has a slot number written in; the controller 55 decodes the slot number and when it detects the slot number of a particular slot, e.g. the fourth transmission slot, it uses this as a trigger to send out the switching control signal to the transmit)receive switcher 56 via reed E. This causes the transmit/receive switcher 56 to change the antenna 6 over to reed F. Then under this condition, in 2.5 ms for which the receiving slots continue (the duration of one frame can be determined by the controller 55), the antenna 6 is changed over to reed D.

When the antenna 6 is connected to reed F, the receive signal, which has reached the antenna 6, is output to reed F via the transmit/receive switcher 56 and it is subjected to the frequency conversion by the frequency converter/amplifier 58 according to the oscillation frequency of the local frequency oscillator 61 so that it obtains a predetermined frequency and it is also amplified, then the converted and amplified signal is further convened from the electrical signal to an optical signal by the electrical-to-optical converter 59 before it is finally sent to the base station 2 via the optical fiber cable 4.

When the antenna 6 is connected to reed D, a send signal transmitted from the base station 2 via the optical fiber cable 3 is converted from the optical signal to an electrical signal by the optical-to-electrical converter 51; the electrical signal is then output to reed C via the distributor 52 and is subjected to the frequency conversion by the frequency converter/amplifier 57 according to the oscillation frequency of the local frequency oscillator 61 so that it obtains a predetermined frequency and it is also amplified, then the convened and amplified signal is transmitted to the antenna 6 via the transmit/receive switcher 56 before it is finally emitted through the antenna 6.

The series of operations described above are repeated every time the fourth transmission slot is received, thereby synchronizing the switching control of the antennas by the transmit/receive switcher 56 with the sending and receiving operation at the base station 2.

At the end of the transmission of the send signal assigned to reed C by the distributor 52, the switching control signal must be sent out from the controller 55 (the moment the transmission of the send signal is completed must fully coincide with the antenna switching performed by the transmit/receive switcher 56); however, there are the time difference due to the hardware and also the time difference due to the software in the controller 55 rendered from the moment the send signal reaches the transmit/receive switcher 56 after the distributor 52 supplies the send signal to reed C to the moment the controller 55 issues the switching control signal after the distributor 52 supplies the send signal to reed A (the signal is distributed and sent to reed A and reed C at the same time).

More specifically, referring to FIG. 3, the send signal supplied to reed A incurs a time delay attributable to the frequency converter/amplifier 53 and the control channel signal detector 54 before the signal reaches the controller 55. Likewise, the send signal supplied to reed C incurs a time delay attributable to the frequency converter/amplifier 57 before it reaches the transmit/receive switcher 56. The time delay due to the frequency converter/amplifier 53 may be regarded as equal to that due to the frequency converter/amplifier 57; therefore, it takes longer for the send signal supplied to reed A to reach the controller 55 by the time delay due to the control channel signal detector 54 than it takes for the send signal supplied to reed C to reach the transmit/receive switcher 56.

Since the control channel signal detector 54 converts a detected control channel signal from the analog signal to the digital signal, such a time delay cannot be ignored in the synchronizing operation. This time difference arises from the hardware and it is the time difference denoted by t1 in (4) of FIG. 3.

Further, when the controller 55 reads the control channel signal and produces the switching control signal, it takes time to analyze the control channel signal and detect a particular slot number, thus causing the time delay. This time delay is the time difference attributable to the software and it is denoted by t2 shown in (4) of FIG. 3.

As stated above, delay time t1 can be predicted in advance from the delay mainly attributable to the hardware of the control channel signal detector 54. Likewise, delay time t2 is the sum of time required for a slot number to be issued from the start of slots, i.e. timing t21 for sending out a slot number, and time t22 required for the controller 55 to decode the slot number; therefore, delay time t2 can also be predicted beforehand.

In the case of the embodiment; the time of one slot is determined by 2.5 ms/4=0.625 ms; therefore, time t3 from the moment the controller 55 detects the fourth slot number to the moment the transmit/receive switcher 5 6 should perform the switching control is determined by 0.625-t1-t2. As stated above, since the values of time t1 and time t2 are known fixed values, time t3 is also a known fixed value. Hence, furnishing the controller 55 in advance with time t3 as the correction value makes it possible to match the output timing of the switching control signal for transmission and receiving for reed E to the timing at which the transmission of the send signal is completed.

Regarding the control of the transmit/receive switcher 56, if the switching control signal is obtained at an accurate timing for the first time by the synchronization control carried out by detecting the slot number of the control channel, then the switching between transmission and receiving is to be performed simply at 2.5-ms intervals after that and the synchronization control need not always be carried out every time a transmission slot is received. It is unavoidable, however, in order to prevent the occurrence of mismatching between the transmit/receive switching timing and the timing for sending out the switching control signal in an extended time of use due to a clock error or for some other reason. Accordingly, it is desirable to perform the transmit/receive switching synchronization control based on the detection of the slot number of the control channel each time a preset number of repetitions of transmission frames is reached. This enables stable transmission/receive switching control to be carried out at all times.

Thus, according to the present invention, antenna devices are connected to a base station by signal transmission paths and the switching between transmission and receiving at the antenna devices is performed according to a control channel signal, thus allowing the transmit/receive switching control to be accurately synchronized with send/receive signals. Further according to the present invention, a plurality of antenna devices can be connected to a single base station and the radio communication range can be expanded as desired in a practical range. In addition, the distance between the base station and an antenna device can be significantly extended and the antenna device can be installed at a desired location, thus increasing the freedom of selection of a radio communication range.

While the foregoing description and drawings represent the preferred embodiments of the present invention, it will be obvious to those skilled in the art that various changes and modifications may be made therein without departing from the true spirit and scope of the present invention.

What is claimed is:

1. A TDMA system radio telephone system comprising:
   a base station having a transmit/receive operation;
   an antenna being installed at a location away from said base station, said antenna having a transmit/receive operation;
   an antenna device being provided between said base station and said antenna;
   separate transmission lines for transferring a send signal and a receive signal between said antenna device and said base station, said send and receive signal establishing a control channel and a speech channel, and said control channel having prearranged slots therein;
   said control channel being continuously monitored by the antenna device while said speech channel is being set; and
   means for synchronizing transmit/receive switching of said antenna in said antenna device with the transmit/receive operation at said base station in accordance with the receiving timing of a particular slot of the control channel.

2. A radio telephone system according to claim 1, wherein said transmission lines are optical fiber cables.

3. An antenna device which is connected to the base station of the TDMA system radio telephone system, which exchanges optical signals with the base station optical signals, and which is linked to the base station by a first optical fiber cable for transmitting a send signal and by a second optical fiber cable for transmitting a receive signal, the antenna device comprising:
   optical-to-electrical converting means for convening the send signal transmitted by the first optical fiber cable from an optical signal to an electrical signal;
   distributing means for distributing the send signal issued by the optical-to-electrical converting means to a first signal path and a second signal path;
   an antenna;
   transmit/receive switching means having a switching operation for alternately connecting the antenna to the first signal path and a third signal path;
   electrical-to-optical converting means for converting the receive signal transmitted to the third signal path from an electrical signal to an optical signal before transmitting it to the second optical fiber cable when the antenna is connected to the third signal path by the transmit/receive switching means; and
   switching control means for isolating a control channel from the send signal transmitted to the second signal path and for analyzing the control channel to synchronize the switching operation of the transmit/receive switching means with the transmit/receive operation of a speech channel in accordance with a receiving timing of particular information of a particular slot written in the control channel.

4. An antenna device according to claim 3, wherein the switching control means performs the control for synchronizing the switching operation of the transmit/receive switching means with the transmit/receive operation of the speech channel each time a preset number of transmission frames of the control channel is repeated and said switching control means generates a switching control signal for a transmission frame, on which no synchronization control is carried out, in accordance with the duration of the transmission frame.

5. A base station for connection to the antenna device of claim 4, said base station having a plurality of the antenna devices connected thereto and comprising:
   receive electric field strength comparing means for comparing the receive electrical field intensities of the receive signals transmitted from the plurality of antenna devices; and
   antenna device selecting means for selecting an antenna device, which permits communication with the greatest receive electric field strength, in accordance with the comparison result given by the receive electric field strength comparing means and for validating the connection with the antenna device while invalidating the connection with other antenna devices.

6. An antenna device according to claim 3, which antenna device exchanges signals with the base station at a carrier frequency which is different from the carrier frequency of a radio link and the first signal path, the second signal path, and the third signal path are respectively further equipped with carrier frequency converting means.

7. A base station for connection to the antenna device of claim 6, said base station having a plurality of the antenna devices connected thereto and comprising:

receive electric field strength comparing means for comparing the receive electrical field intensities of the receive signals transmitted from the plurality of antenna devices; and antenna device selecting means for selecting an antenna device, which permits communication with the greatest receive electric field strength, in accordance with the comparison result given by the receive electric field strength comparing means and for validating the connection with the antenna device while invalidating the connection with other antenna devices.

8. An antenna device according to claim 3, further comprising delay time correcting means for correcting a time delay produced from the moment a signal is received from the base station to the moment particular information is decoded, said time delay being caused by a difference in the signal transmission time between the first signal path and the second signal path and the time required for the particular information of a particular slot of a control channel to be decoded.

9. A base station for connection to the antenna device of claim 8, said base station having a plurality of the antenna devices connected thereto and comprising:

receive electric field strength comparing means for comparing the receive electrical field intensities of the receive signals transmitted from the plurality of antenna devices; and antenna device selecting means for selecting an antenna device, which permits communication with the greatest receive electric field strength, in accordance with the comparison result given by the receive electric field strength comparing means and for validating the connection with the antenna device while invalidating the connection with other antenna devices.

10. A base station for connection to the antenna device of claim 3, said base station having a plurality of the antenna devices connected thereto and comprising:

receive electric field strength comparing means for comparing the receive electrical field intensities of the receive signals transmitted from the plurality of antenna devices; and antenna device selecting means for selecting an antenna device, which permits communication with the greatest receive electric field strength, in accordance with the comparison result given by the receive electric field strength comparing means and for validating the connection with the antenna device while invalidating the connection with other antenna devices.

* * * * *